United States Patent [19]

Takeda et al.

[11] Patent Number: 4,577,117

[45] Date of Patent: Mar. 18, 1986

[54] LIGHT RESPONSIVE SWITCH STRUCTURE FOR USE IN A MOTOR VEHICLE OR THE LIKE

[75] Inventors: Nobuhiro Takeda; Masaichi Hattori; Akira Hanaki, all of Aichi, Japan

[73] Assignee: Kabushiki-Kaisha Tokai-Rika-Denki-Seisakusho, Nishibiwajima, Japan

[21] Appl. No.: 501,493

[22] Filed: Jun. 6, 1983

[30] Foreign Application Priority Data

Jun. 14, 1982 [JP] Japan .......................... 57-102795[U]
Jun. 15, 1982 [JP] Japan ................................. 57-89133

[51] Int. Cl.⁴ ............................................. H01H 3/16
[52] U.S. Cl. ............................. 307/10 R; 200/61.27; 200/153 J; 307/10 LS; 315/82; 335/190
[58] Field of Search ..................... 200/12, 61.3, 153 J; 335/190, 164, 186–189; 340/942, 902, 904; 250/215; 307/10 LS; 315/82, 83, 149, 154, 155, 157, 159

[56] References Cited

U.S. PATENT DOCUMENTS

| | | | |
|---|---|---|---|
| 2,924,680 | 2/1960 | Swenson | 200/61.3 |
| 3,824,362 | 7/1974 | Bury | 200/153 J |
| 3,867,596 | 2/1975 | Schadow | 200/153 J |
| 4,208,615 | 6/1980 | Jones et al. | 315/82 X |
| 4,249,160 | 2/1981 | Chilvers | 307/10 LS X |
| 4,305,054 | 12/1981 | Woodard | 335/164 |
| 4,376,909 | 3/1983 | Tagami et al. | 315/83 X |

Primary Examiner—J. R. Scott
Attorney, Agent, or Firm—Weiser & Stapler

[57] ABSTRACT

A switch structure comprising an actuator reciprocally movably mounted on a casing so as to control a contact structure, a cardio-shaped grooved cam provided with the actuator, a wire spring secured at one end to the casing and disposed at other free end in the grooved cam, a locker structure which alternatively holds the actuator at a return position or at an operative position by selectively engaging the free end of the wire spring with the first or second engagement portions each provided with the grooved cam, and an electromagnetic solenoid which releases the free end of the wire spring from the second engagement portion.

7 Claims, 21 Drawing Figures

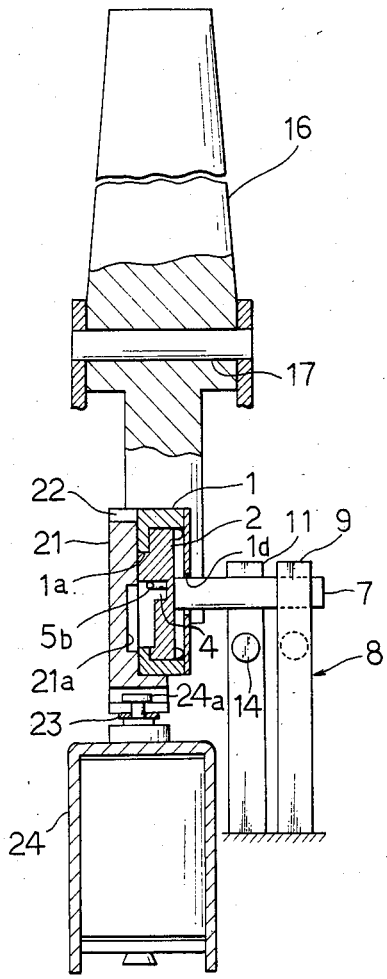
FIG. 2
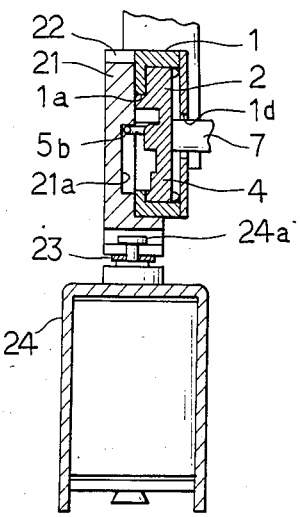
FIG. 3
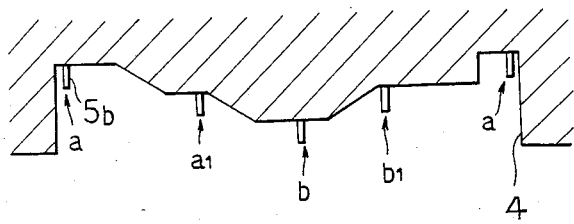
FIG. 4
FIG. 5

LIGHT RESPONSIVE SWITCH STRUCTURE FOR USE IN A MOTOR VEHICLE OR THE LIKE

BACKGROUND OF THE INVENTION (1) Field of the Art

This invention relates to a switch structure which has a contact structure controlled by an actuator reciprocally movably mounted between a return position and an operative position, and more particularly concerns to a switch structure which in addition comprises a locker structure to hold the actuator at the operative position, and an electromagnetic solenoid to release the actuator from the operative position.

(2) Description of the Prior Art

In a motor vehicle, there is provided an auto-dimmer switch device which automatically changes the head lamp from the high-beam position to the low-beam position and vice versa by detecting whether a light from the head lamp of an on-coming motor vehicle is present or not.

The construction is such that an increased mumber of the on-coming motor vehicles causes the head lamp to present a frequent change between the high-beam position and the low-beam position. Thus makes a driver, on the one hand, mistakenly believe a passing operation, and on the other hand, difficult to see a foreground.

In a motor vehicle, there is provided a glare preventive mirror device which automatically move a rear view mirror from a normal position to a glare preventive position when sustained the light from a head lamp of the motor vehicle behind. Such is the construction that the rear view mirror may be oscillated between the glare preventive position and the normal position. Thus disadvantageously renders the driver to suffer from the intermitting reflexion in the rear view mirror.

SUMMARY OF THE INVENTION

It is therefore a primary object of the present invention to provide a novel switch structure which is particularly effective in eliminating the above drawbacks of the prior art devices.

That is to say, it is an object of the invention to provide a switch structure which, when incorporated in a dimmer switch device, enables to prevent a head lamp from changing more often than necessary between the high-beam position and the low-beam position by allowing the head lamp to unilaterally change from the high-beam position to the low-beam position.

It is another object of the invention to provide a switch structure which, when incorporated in a glare preventive mirror device, enables to prevent a driver from sustaining an intermitting reflexion by allowing a rear-view mirror to unilaterally change from a glare preventive position to a normal position.

According to the present invention, there is provided a switch structure comprising a contact structure, an actuator reciprocally movably mounted between a return position and an operative postion, a return spring means providing a spring force with said actuator so as to move from said operative position to said return position, a locker structure which holds said actuator at said operative position against the force of said return spring means, and an electromagnetic solenoid which releases said actuator to move from said operative position to said return position by the force of said return spring means in compliance with an external device.

In said switch structure, when said actuator is manually moved in one direction from the return position to the operative position, said actuator is held at the operative position by said locker structure. Said actuator, if little further moved from the above position in the direction similar to that mentioned above, is released to move back to the return position. In this instance, said actuator is also automatically released by energizing said electromagnetic solenoid based on the instruction from said external device to transmit the displacement of the plunger to said locker structure. When incorporated in a dimmer switch for motor vehicle, said actuator at the return position allows the head lamp to occupy the low-beam position, while the actuator at the operative position being the head lamp to occupy the high-beam position. In so doing, manually operating said actuator or energizing said solenoid renders the head lamp to change from the high-beam position to the low-beam position. In this instance, the instruction from said external device may be, by way of example, a light-detector signal to a head lamp of motor vehicle, or off-signal to a light switch of motor vehicle.

On the other hand, when incorporated in a glare preventive mirror device, a rear view mirror is automatically moved back from a glare preventive position to a normal position in association with the mode change of said contact structure occasioned by said actuator which moves from the operative position to the return position.

The above and other objects, features and advantage of the present invention will become apparent from the following description and the appended claims, taken in conjunction with the accompanying drawings which shows by way of example preferred embodiments of the present invention and in which like component parts are designated by like reference numerals throughout various figures.

BRIEF DESCRIPTION OF THE DRAWINGS

In the accompanying drawings:

FIG. 2 is a longitudinal cross-sectional view along the line II-II of FIG. 1;

FIG. 3 is a view similar to FIG. 2, but showing an operational condition different from FIG. 2;

FIG. 4 is an enlarged plan view of a cardio-shaped grooved cam;

FIG. 5 is a longitudinal cross-sectional view showing the bottom configuration of the grooved cam along the broken line A and B in FIG. 4;

DESCRIPTION OF PREFERRED EMBODIMENTS

Figure 1:
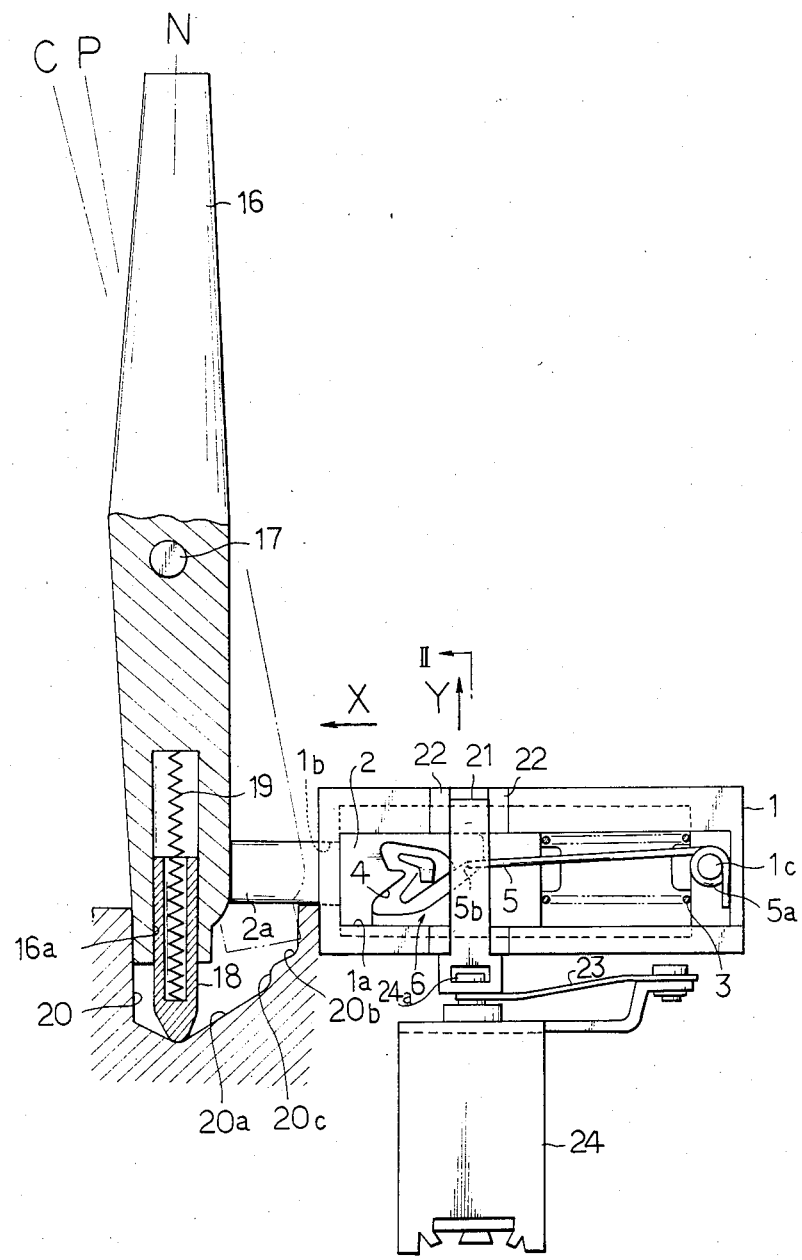
FIG. 1 is a front elevational view of a switch structure according to the first embodiment of the invention, but partly in section.

Referring to the drawings and first to FIGS. 1 to 5, there is shown a switch structure incorporating a dimmer switch of motor vehicle according to the first embodiment of the invention. As shown in FIGS. 1 to 3, numeral 1 designates a rectangular casing having a top opening 1a, side opening 1b and bottom opening 1d. In the casing 1 is an actuator 2 slidably disposed which has a projection 2a projected outwardly through the opening 1b, so that the actuator 2 moves in the directions of arrow X and opposite to arrow X as indicated in FIG. 1. A return compression spring 3 is provided between the end of the actuator 2 and the inner wall of the casing 1 to always bias the actuator 2 in the direction of arrow X. A cardio-shaped grooved cam 4, as is known for those skilled in the art, is provided with the surface of the actuator 2 as in detail described hereinafter in FIG. 4. A latch wire spring 5, which serves as a cam follower, has a coiled end 5a secured to a lateral axle 1c provided within the casing 1, and at the same time, has a generally L-shaped probe 5b at other free end normally biased in the direction of arrow Y seen in FIG. 1. The probe 5b of the wire spring 5 is received into the groove cam 4 to form a locker structure 6 therewith as is known for those versed in the art.

In this instance, the probe 5b positions at (a)(the first engagement position) as seen in FIG. 4, where the actuator 2 moved all the way in the direction of arrow X to occupy a return position. Upon moving the actuator 2 in the direction opposite to arrow X from the return position to an operative position, the probe 5b of the wire spring 5 is adapted to position at (b)(the second engagement position) so as to hold the actuator 2 at the operative position.

Figure 6A:
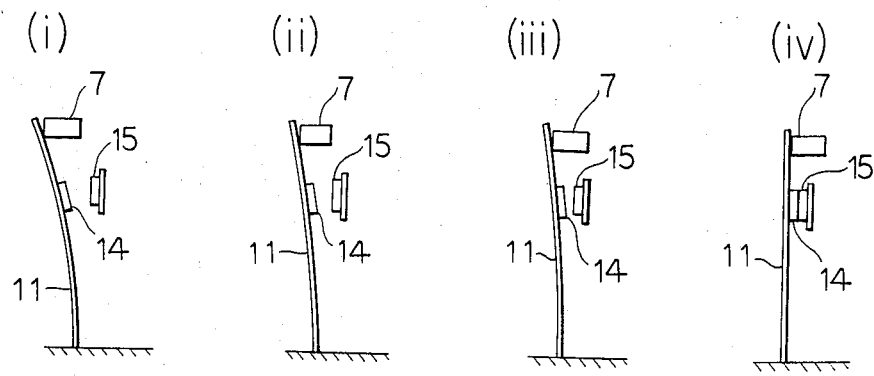
FIGS. 6a and 6b are schematic views illustrating how a contact structure works in connection with a switch structure.
Figure 6B:
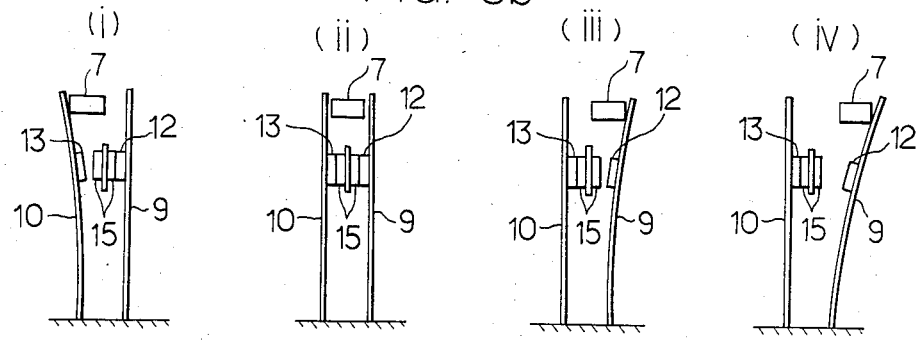

Meanwhile, at the underside of the actuator 2 is a lug 7 provided which protracts outward through the elongated opening 1d to control a contact structure 8. The contact structure comprises, as seen in FIGS. 6a and 6b, a single conductive blade 11 having a movable contact 14 (FIG. 6a); a pair of spaced blade 9, 10 in turn having movable contacts 12, 13 (FIG. 6b); and fixed contacts 15, 15 and 15 coresponding in turn to the movable contacts 9. 10, 11. In this situation, the blades 10 and 11 are located at one side of the lug 7, while the blade 9 being opposite to the blades 10 and 11, so that the blades may displace in compliance with the movement of the lug 7 as in detail described hereinafter.

Reverted to FIG. 1, there is shown a lever 16 pivotably mounted by means of a central pin 17. One end of the lever 16 has a hollow portion 16a into which a plunger 18 is axially movably mounted, and always biased toward a recess 20 by means of a compression coil spring 19. The recess 20, which provides a detent and break away feeling with the lever 16 as will be better understood later, has ramp portions 20a, 20b, and a stepped portion 20c where the ramp portion 20a, 20b join.

Thus allows the lever 1b to reciprocally move between a neutral position (N) where the plunger 18 is located at the end of the ramp portion 20a and a changer position (C) where the plunger 18 is located at other ramp portion 20b through a passing position (P) where the plunger 18 being at the stepped portion 20c. In so doing, the lever 16 normally positions at the neutral position (N) by the bias force of the compression coil spring 19. Upon moving the lever 16 from the neutral position (N) to the changer position (C), the lever 16 pushes the actuator 2 through the projection 2a to move in the direction opposite to arrow X against the force of the return spring, so that the probe 5b of the wire spring 5 is moved relatively with the grooved cam 4 in the direction of arrow X to position at ($a_1$) as seen in FIG. 4.

On the other hand, upon further moving the lever 16 from the neutral position (N) to the passing position (P), the probe 5b is adapted to position at ($a_2$) or ($b_2$) in a manner similar to that mentioned above. Between a pair of guide rails 22, 22 provided with the upper surface of the casing 1, is a cancel plate 21 movably mounted to slide in the direction of arrow Y, inner side of which has a conecave-shaped notch 21a in registeration with the wire spring 5. In so doing, when the actuator 2 occupies the return position where the probe 5b is located at (a) as seen in FIG. 4, the wire spring 5 is kept out of the notch 21a (see FIG. 2). When the actuator 2 is moved to the operative position where the probe 5b is located at (b), the probe 5b is adapted to be pushed upward due to the bottom configuration of the grooved cam 4 so as to advance the wire spring 5 into the notch 21a as better understood hereinafter.

Reverted again to FIG. 1, a leaf spring 23 is provided to always bias the cancel plate 21 in the direction of arrow Y. While, an electromagnetic solenoid 24 has its plunger 24a connected to the cancel plate 21 to allow the plate 21 to move in the direction opposite to arrow Y against the force of the leaf spring 23 when energized.

Figure 7:
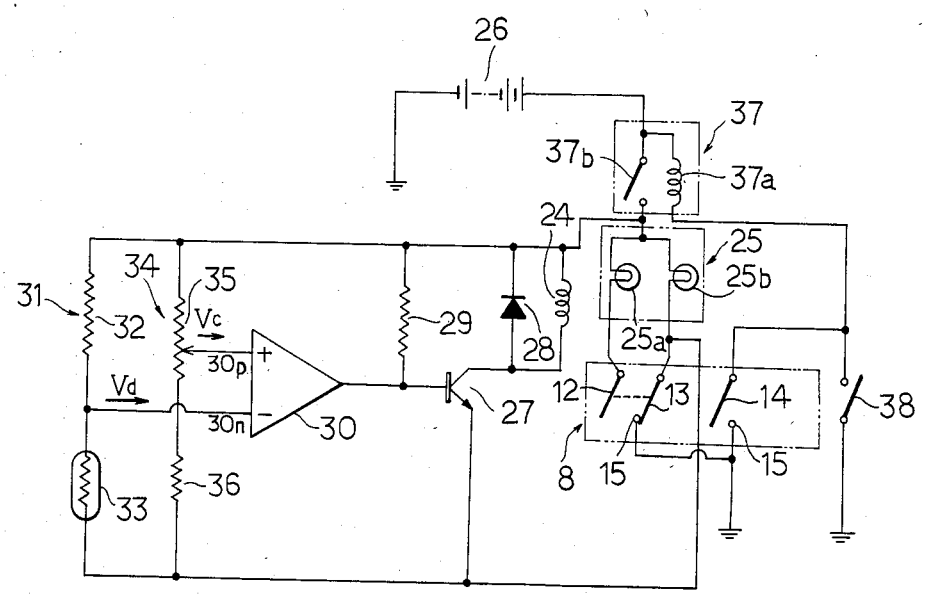
FIG. 7 is a view illustrating an electrical circuit in connection with a switch structure.

Now FIG. 7 shows an electrical circuit in which numerals 26, 27, 28, 29 and 30 in turn designate a battery, a transistor, a diode, an electrical resistance and a comparator. A detector circuit 31 which serves as an external device comprises an electrical resistance 32 and a cadmium sulfide cell 33 connected in series with the resistance 32. The detector circuit 31 is adapted to supply a detector voltage (Vd) to inverting input terminal (30n) of the comparator 30 in response to the optical strength of the head light from an on-coming motor vehicle.

A voltage divider circuit 34, which is adapted to supply a reference voltage (Vc) to non-inverting input terminal (30p), has a variable resistance 35 for adjusting sensitivity of the cell 33 and an electrical resistance 36 connected in series with the resistance 35. A head lamp relay 37 has its excitation coil 37a connected across the battery 26 and the ground through a light switch 38, and its normal open relay switch 37b connected to the movable contacts 12, 13 in the contact structure 8 through low- and high-beam filaments 25a, 25b in parallel with each other in the head lamp 25. In this instance, the movable contact 14 other than the contact 12, 13 is connected to the common point of the excitation coil 37a and the light switch 38 with the fixed contact 15 grounded, while the solenoid 24 is connected so as to be energized through the relay switch 37b.

Now an attention is called to FIG. 5, which shows a longitudinal sectional view along the broken lines A and B of the bottom of the grooved cam 4 seen in FIG. 4. When the actuator 2 occupies the return position as seen in FIG. 1, the movable contact 12 makes contact against the fixed contact 15 in the contact structure 8 seen at (i) in FIG. 6b. In this condition, turning on the light switch 38 makes the excitation coil 37a energize to close the relay switch 37b, and as a consequence, the low-beam filament 25a is energized through the relay switch 37b, the movable contact 12 and fixed contact 15 so as to turn on the head lamp 25 at the low-beam position. In order to change the head lamp 25 from the low-beam position to the high-beam position, the lever 16 is manipulated to rotate to the changer position (C), and released to automatically return to the neutral position (N). In consequence, the probe 5b of the wire spring 5 is moved relatively with the grooved cam 4 in the direction of arrow X for the reason that the actuator 2 moves in the direction opposite to arrow X. As a result, the probe 5b moves along the line A from the position (a) to the position (a₁) as seen in FIGS. 4 and 5. With the release of the lever 16, the projection 2a is liberated from the lever 16 to allow the actuator 2 to move along the line A in the direction of arrow X by the force of spring 3. This results in the probe 5b being relatively moved along the line A in the direction opposite to arrow X to engage with the central valley 4a of the cam 4 at (b)(refer to FIGS. 4 and 5).

In this condition, the probe 5b, thus engaged with the valley 4a, prevents the actuator 2 from further moving to hold the actuator 2 at the operative position.

On the other hand, the lug 7 effects the movable contact 13 to make contact against the fixed contact 15 as seen at (iii) in FIG. 6b, so that the high-beam filament 25b is energized through the movable contact 13 and the fixed contact 15 to turn on the head lamp 25 at the high-beam position.

When the head lamp 25 is changed from the above high-beam position to the low-beam position, the lever 16 is rotated again to the changer position (C), and released to return to the neutral position (N). During this operation, the probe 5b is allowed to move along the line B from the position (b) to the position (b₁), and then to relatively move along the line B in the direction opposite to arrow X to occupy the return position due to the fact that the actuator 2 is permitted to move in the direction of arrow X in compliance with the movement of the lever 16 toward the neutral position (N). This makes the head lamp 25 turn on at the low-beam position by the mechanism of the contact structure 8 seen in FIG. 6b. It is noted the contact structure 8 is such that when the head lamp 25 is changed from the low-beam position to the high-beam position and vice versa, the contact structure 8 undergoes the condition as seen at (ii) in FIG. 6b to prevent the occurrence of so-called dark-zone period.

In the meanwhile, when the lever 16 is rotated from the neutral position (N) to the passing position (P) with the light switch in off-state, the probe 5b moves from the position (a) to the position (a₂) as seen in FIG. 4, and at the same time, the contact structure 8 allows both the movable contacts 13, 14 to make contact against the fixed contact 15 as seen in FIGS. 6a and 6b, so that the excitation coil 37a is energized through the movable contact 14 and the fixed contact 15 to close the relay switch 37b. The results in the high-beam filament 25b being energized through the relay switch 37b, the movable contact 13 and the fixed contact 15 so as to turn on the head lamp 25 at the high-beam position. Upon the release of the lever 16, the lever 16 returns to the neutral position (N), thus allows the actuator 2 to move in the direction of the arrow X by the force of the return compression spring 3 to occupy the return position, so that the probe 5b relatively moves in the direction opposite to arror X from the position (a₂) to the position (a) as seen in FIG. 4. This renders the contact structure 8 to be seen at (i) in FIGS. 6a and 6b in which separation between the movable contact 14 and the fixed contact 15 makes the relay switch 37b open to turn off the head lamp 25. With the lever 16 reciprocally rotated between the neutral position (N) and the passing position (P), the head lamp 25 is turned on and off at the high-beam position to perform a passing action.

In case where the lever 16 is rotated to the passing position (P) with the actuator 2 in the operative position, the probe 5b moves from the position (b) to the position (b₂), and at the same time, the contact structure 8 is in the condition as seen at (iv) in FIGS. 6a and 6b to turn on the head lamp 25 in the high-beam position in a manner similar to that mentioned above. With the release of the lever 16, the probe 5b returns to the position (b), so that the contact structure 8 is in the condition as seen at (iii) in FIGS. 6a and 6b to turn off the head lamp 25.

In so doing, with the light switch 38 closed to turn on the head lamp 25 at the high-beam position (with the actuator 2 in the operative position) in the night hours or like, if there is an on-coming motor vehicle, the cadmium sulfide cell 33, which detects the optical strength of the head lamp from the on-coming motor vehicle, decreases its electrical resistance value to the point where the detector voltage (Vd) level from the detector circuit 31 is lower than the reference voltage (Vc) level from the voltage divider circuit 34. In consequence, the transistor 27 is turned on for the reason that the output of the comparator 30 inverts from the low level to the high level, thus allows the solenoid 24 to be energized so as to move the cancel plate 21 in the direction opposite to arrow Y against the force of the leaf spring 23. The cancel plate 21, thus moved in the above direction, renders to push the probe 5b in the direction opposite to arrow Y so as to expel the probe 5b from the valley 4a of the groove cam 4, since latch wire spring 5 positions within the notch 21a of the cancel plate 21. This is a release of the locker structure 6, which allows the actuator 2 to move in the direction of arrow X by the return compression coil spring 3 to occupy the return position, so that the probe 5b relatively moves in the direction opposite to arrow X to turn on the head lamp 25 at the low-beam position. Thus the head lamp 25 is automatically changed from the high-beam position to the low-beam position when there is an on-coming motor vehicle. On the other hand, the solenoid 24 is deenergized in compliance with the change from the high-beam position to the low-beam position, since the movable contact 13 separates from the fixed contact 15.

Figure 8:
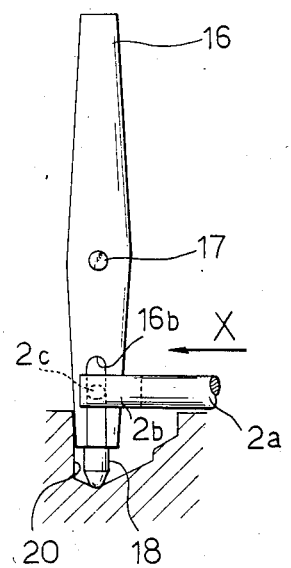
FIG. 8 is a side elevational view illustrating a connection structure around a lever according to the second embodiment of the invention.
Figure 9:
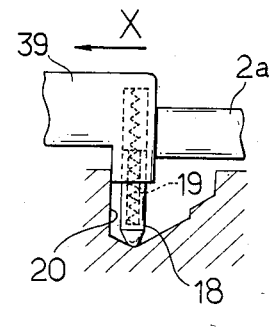
FIG. 9 is a side elevational view illustrating a connection structure around a knob according to the third embodiment of the invention.

Now FIG. 8 and FIG. 9, in turn show the second and third embodiments of the invention in which elements similar to those of the first embodiment are designated by the correponding numerals. Arrangements other than those particularly described below are identical to those in the first embodiment. In FIG. 8 of the second embodiment, the actuator 2 has its projection 2a rockably connected to the lower part of the lever 16 to dispense with the compression coil spring 3. For attaining this structure, the projection 2a has, by way of illustration, a crosspiece 2b at its end, across the legs of which a pivotal pin 2c is bridged. The pin 2c is received into an elongated bore 16b provided laterally with the lever 16.

In FIG. 9 of the third embodiment, instead of the pivotally moving lever 16, is a linearly moving knob 39 provided which is adapted to reciprocal move in the direction of arrow X and opposite to arrow X. The reciprocally movement of the knob 39 causes the actuator 2 to move in a manner similar to that described in the first embodiment.

Figure 10:
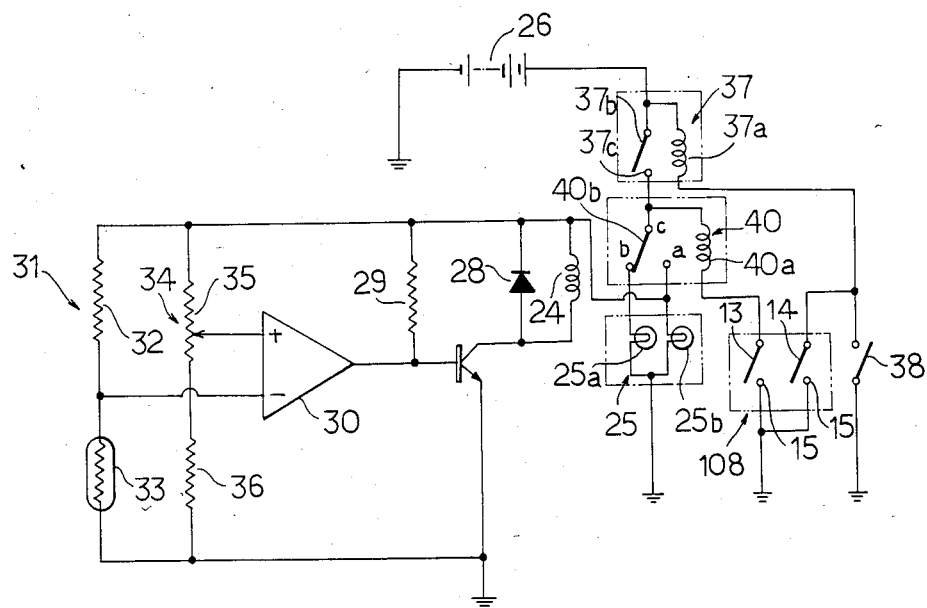
FIG. 10 is a view similar to FIG. 7 according to the fourth embodiment of the invention.

FIG. 10 shows the fourth embodiment of the invention in which a contact structure 108 is devoid of the movable contact 12 and the blade 9 of the first embodiment. In this instance, the movable contact 13 is separated from the fixed contact 15 where the actuator 2 occupies the return position (low-beam position), while the movable contact 13 is made contact against the fixed contact 15 where the actuator 2 occupies the operative position (high-beam position). A dimmer relay 40 has at one end of its excitation coil 40a connected to the fixed contact 37c of the relay switch 37b, and at another end of the excitation coil 40a connected to the movable contact 13 of the contact structure 108. The dimmer relay 40 has a relay switch 40b, the normal closed contacts, (b), (c) of which lie in the electrically conductive path of the low-beam filament 25a, while normal open contacts (c), (a) of the relay switch 40b being in that of the high-beam filament 25b.

Figure 11:
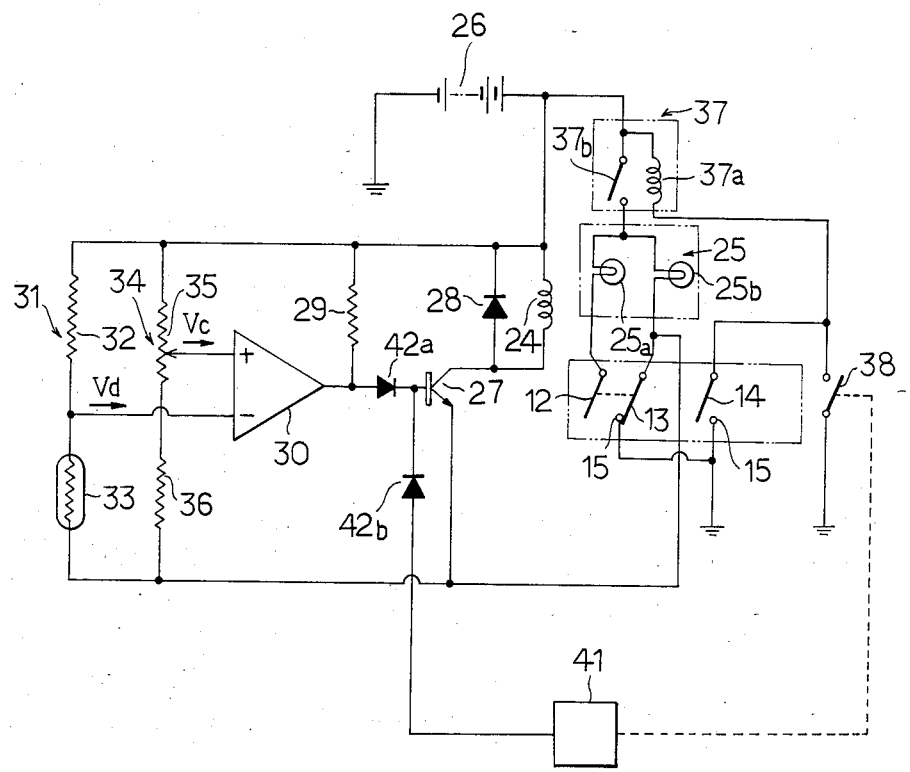
FIG. 11 is a view similar to FIG. 7 according to the fifth embodiment of the invention.

FIG. 11 shows the fifth embodiment of the invention which is structurally similar to the first embodiment except for that a condition detector circuit 41 and diodes 42a, 42b are provided, while the solenoid 24 is adapted to be energized forthwith from the battery 26. The condition detector circuit 41, which serves as an external device, generates the high-level signal to turn on the transistor 27 so as to energize the solenoid 24, when the light switch 38 is changed from on-state to off-state. Accordingly, each time when the light switch 38 is open, that is to say, each time when the head lamp 25 is turned off, the solenoid 24 is energized to move back the actuator 2 to the return position in a manner similar to that mentioned in the first embodiment.

In the condition where the actuator 2 occupies the return position as mentioned above, the head lamp 25 is turned on at the low-beam position when the light switch 38 is closed. This obviates the possibility that the head lamp 25 is inadvertently turned on at the high-beam position. It is appreciated that instead of the condition detector circuit 41, may a condition detector circuit be provided which turns on the transistor 27 when an ignition switch (not shown) is changed from on-state to off-state.

Figure 12:
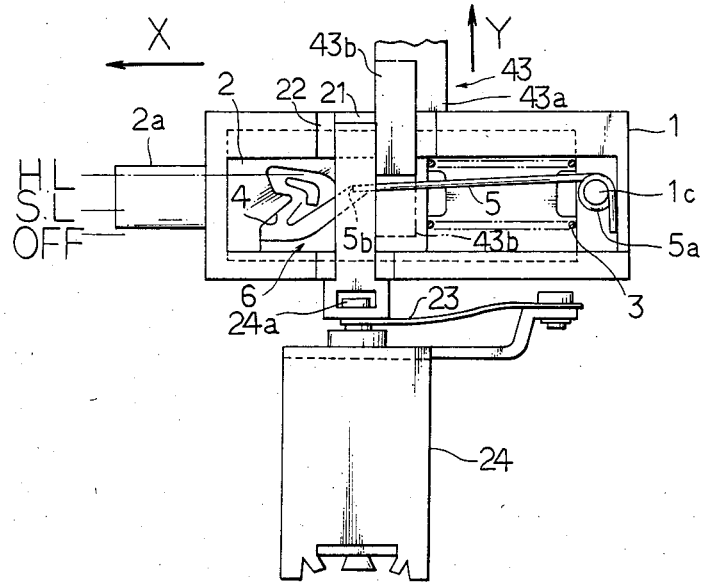
FIG. 12 is a view similar to FIG. 1 according to the sixth embodiment of the invention.
Figure 13:
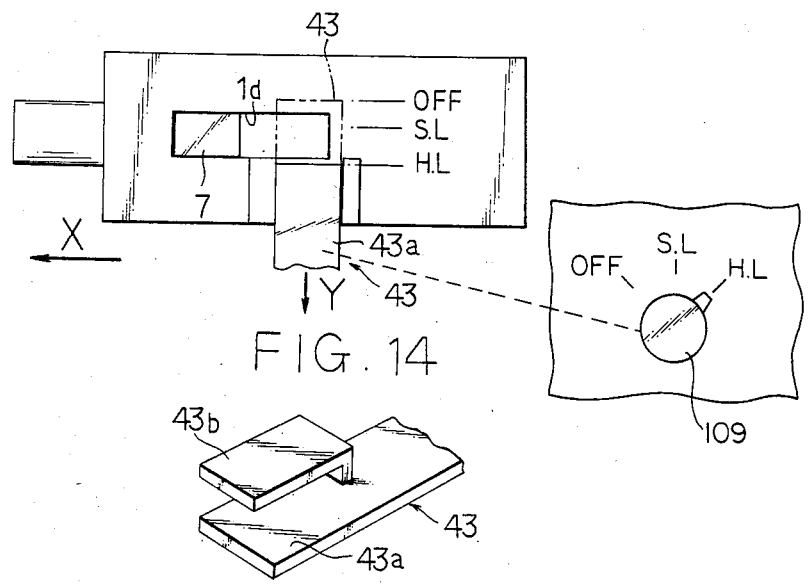
FIG. 13 is a view illustrating a switch structure looking from behind the sheet of FIG. 12.
Figure 14:
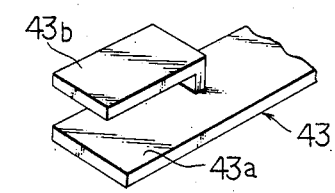
FIG. 14 is a perspective view illustrating a part component of FIG. 13, but partly broken.
Figure 15:
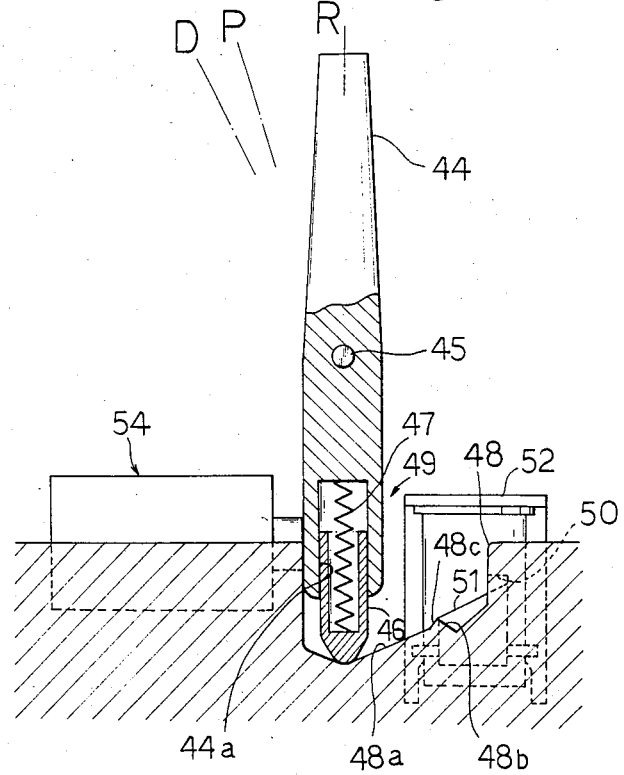
FIG. 15 is a front elevational view illustrating a switch structure according to the seventh embodiment of the invention, but partly in section.

FIGS. 12 through 14 show the sixth embodiment of the invention in which a movable member 43 is added with the electrical circuit (see in FIG. 7) identical to the first embodiment employed. The movable member 43 has a stop plate 43a and an auxiliary cancelling piece 43b secured to the plate 43a, so that the movable member 43 is slidably mounted on the casing 1 with the casing 1 sandwitched between the stop plate 43a and the piece 43b. Such is the condition that the movable member 43, with the stop plate 43a and the piece 43b respectively oriented to the bottom opening 1d and the wire spring 5, is reciprocally moved in the dual direction of arrow Y and opposite to arrow Y in association with the rotational operation of a lighting lever 109 (see FIG. 13). When the lighting lever 109 occupies OFF-position (OFF), the movable member 43 holds both ends of the stop plate 43a and the piece 43b in the position at (OFF) depicted in FIGS. 12 and 13, and in turn moves the formers to the positions at (S.L) and (H.L) as the lever displaces from OFF-position through Small-Lamp position to Head-Lamp (HL) position.

Furthermore, such is the construction that the stop plate 43a, if positions at (OFF) or (S.L), effects to block the lug 7 of the actuator 2 from moving in the direction opposite to arrow X, although allowing the lever 16 to rotate between the neutral position (N) and the passing position (P). On the other hand, the movable member 43 is adapted to have the piece 43b engage the latch wire spring 5 and push in the direction opposite to arrow Y against the force of the latch wire spring 5 when the actuator 2 moves to the opposite position to push the wire spring 5 upward due to the bottom configuration of the grooved cam 4.

In the condition where the lighting lever 109 moves to the Head-Lamp position (HL) to close the light switch 38 as shown in FIG. 7, the lever 16 is allowed to rotate between the changer position (C) and the neutral position (N) for the reason that the movable member 43 has both the stop plate 43a and the piece 43b position at (H.L), so that the head lamp 25 is changed at its position in accordance with the movement of the lever 16 in a manner similar to that mentioned in the first embodiment. When the lighting lever 109 moves from the Head-Lamp position (HL) to the Small-Lamp (SL) position or the OFF position (OFF) with the head lamp 25 turned on at the high-beam position, the piece 43b moves to the position of (S.L) or the position of (OFF) to push the wire spring 5 in the direction opposite to arrow Y. This expels the probe 5b out of the valley 4a to move the actuator 2 to the return position.

Such is the construction that each time the head lamp 25 is turned off, the actuator 2 automatically moves to the return position where the head lamp 25 will be lit at the low-beam position when the light switch 38 is closed. This eliminates the possibility that the head lamp 25, once turned off, is inadvertently lit at the high-beam position. In addition, such is also the construction that only when the stop plate 43a positions at (H.L), that is, only when the lighting lever moves to the Head-Lamp position for lighting the head lamp 25, the lever 16 is allowed to move to the changer position (C). Accordingly, the actuator 2 is deterred from being mistakenly moved to the operative position when the head lamp 25 is in an extinct condition. From this point of view, the possibility that the head lamp 25 is inadvertently turned on at the high-beam position, is obviated.

FIGS. 15 through 18 show the seventh embodiment of the invention which will be described below:

Pivotably mounted by means of a pin 45 is a lever 44 for a dimmer switch of motor vehicle. To a cylindrical portion 44a provided with the lower portion of the lever 44 is a spring biased plunger 46 slidably mounted which is always biased toward the recess 48 by the force of a compression coil spring 47. The recess 48, innermost portion of which has valley portions 48a, 48b and a hill portion 48c provided between the valley portions 48a, 48b, forms a latch mechanism 49 in cooperation with the plunger 4b and the compression coil spring 47. So, the lever 44 is selectively held between a return position (R) where the plunger 46 positions at the valley 48a, and an operative position (D) where the plunger 46 positions at valley 48b. On the other hand, when the lever 44 is rotated to the passing position (P) where the plunger 46 positions at the hill 48c, the plunger 46 climbs the slope of the hill 48c with a gradually increasing resistance force provided with the lever 44 as a detent feeling. Upon release of the lever 44 from the passing position (P), the lever 44 automatically moves to the return position (R) by the force of the compression coil spring 47. With the recess 48, particularly positioning at the valley 48b is a vertical guide slot 50 provided into which a planar lifter 51 is vertically movably mounted. In this situation, when the lifter 51 is moved upward with the lever 44 in the operative position (D), the lifter 51 renders to push the plunger 46 upward so that the plunger 46 is expelled from the valley 48b so as to move the lever 44 to the return position (R) with the asist of the spring 47. An electrical magnet 52 has an actuator plate 52a always biased to push the lifter 51 upward by the action of a leaf spring 53. Such is the construction that the lifter 51 usually makes its upper end project from the guide slot 50 as seen in phantom line of FIG. 16, while the lifter 51 moves downward against the force of the leaf spring 53 when the plunger 46 positions at the valley 48b as seen in solid line of FIG. 16.

Figure 17A:
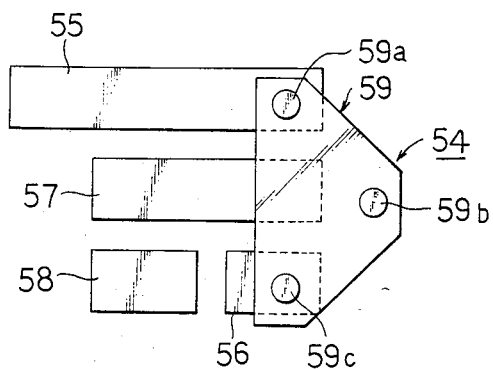
FIGS. 17a, 17b, and 17c are illustrative plan views showing how a movable contact works toward fixed contacts in a contact structure of FIG. 16.
Figure 16:
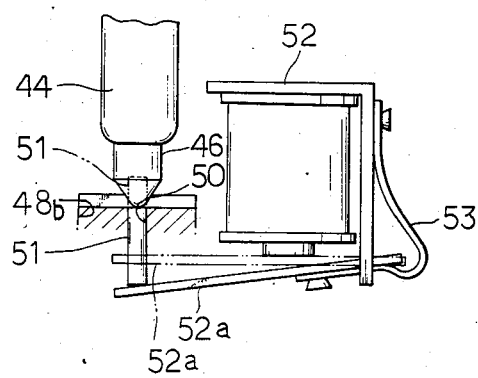
FIG. 16 is a side elevational view looking in a direction different from FIG. 15.
Figure 17B:
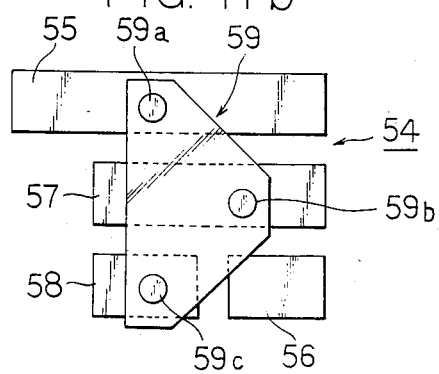
Figure 17C:
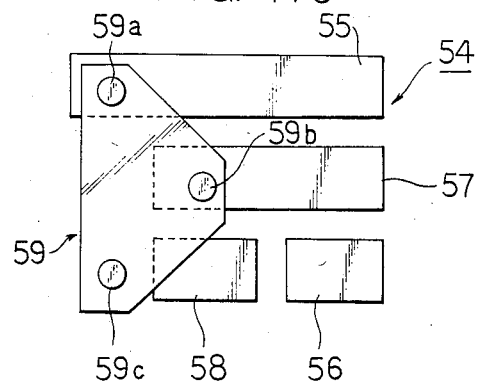

In the meantime, a contact mechanism 54 which is adapted to be actuated by the lever 44 comprises, as seen in FIGS. 17a, 17b and 17c, a fixed contacts 55 through 58, and a movable contact 59 having point 59a through 59c. In this instance, lever 44 occupying the return position (R) makes the movable contact 59 locate at (0) seen in FIG. 17a, to connectively bridge across the fixed contacts 55 and 56 by way of the points 59a and 59c. Upon moving the lever 44 from the above return position (R) to the passing position (P), the movable contact 59 moves to the position at (p) seen in FIG. 17b, where the fixed contacts 55 and 57 are bridged by way of the points 59a and 59b, while other fixed contacts 57 and 58 being bridged by way of the points 59b and 59c. The lever 44 further moved to the operative position (D) renders the movable contact 59 to bridge across the fixed contacts 55 and 57 by way of the points 59a and 59b as seen at (q) in FIG. 17c.

Figure 18:
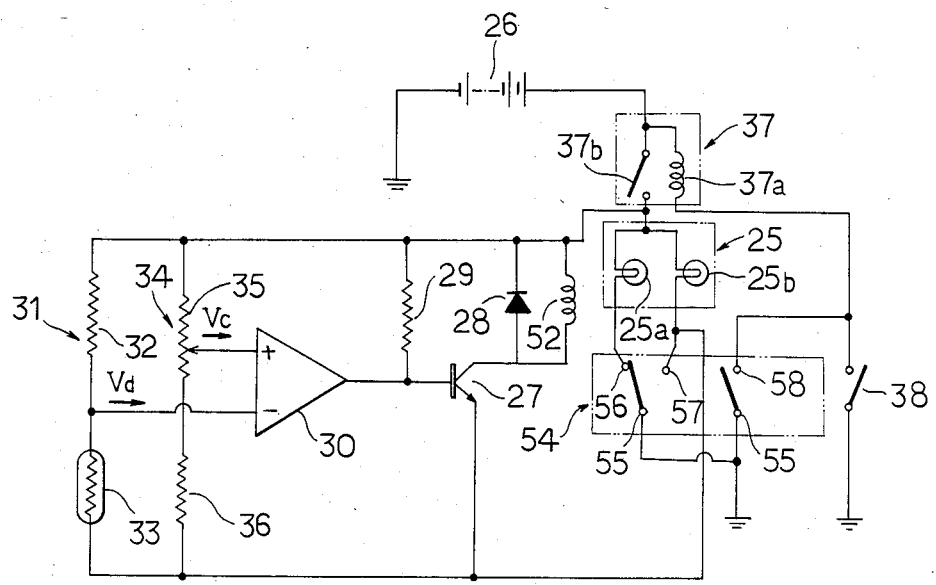
FIG. 18 is a view similar to FIG. 7.

In this situation, the contact mechanism 54 is adapted to be controlled by an electrical circuit shown in FIG. 18 in which element similar to those of the first embodiment of FIG. 7 are designated by the corresponding numerals, and arrangements other than those specifically described are identical to those in the first embodiment of FIG. 7.

According to the seventh embodiment of the invention, the lever 44 moved from the return position (R) to the operative position (D) with the light switch 38 in on-state, causes the head lamp 25 to be changed from the high-beam position to the low-beam position in a manner similar to that mentioned in the first embodiment. On the other hand, the lever 44 moved to the passing position (P) with the light switch in off-state, causes the head lamp 25 to be turned on at the high-beam position.

In so doing, with the head lamp 25 lit at the high-beam position, that is to say, with the lever 44 moved to the operative position (D), if there appears an on-coming motor vehicle in the night hours or the like, the transistor 27 turned on to energize the electromagnet 52 in a manner similar to that mentioned in the first embodiment. The electromagnet 52, thus energized, causes the filter 51 to be pushed upward by the actuator plate 52a so as to expel the plunger 46 out of the valley 48b, so the lever 44 moves back to the return position (R) to turn on the head lamp 25 at the low-beam position. Thus enables the head lamp 25 to automatically change from the high-beam position to the low-beam position where there is an oncoming motor vehicle.

It is noted that the present invention is incorporated not only to a dimmer switch but to a glare preventive mirror for motor vehicle. In this case, the glare preventive mirror is manually held at a glare preventive position by means of a locker mechanism where there is a motor vehicle behind. Where there is devoid of a motor vehicle behind, detecting the absence of the motor vehicle behind, automatically releases the locker mechanism to allow the glare preventive mirror to move from the glare preventive position to a normal position.

What is claimed is:

1. A dimmer switch device for use with head lamps of an automotive vehicle for automatically changing the head lamps only from high beam to low beam comprising;

(1) manually operative means (16,39) disposed for reciprocal movement between a return position (N) and an operative position (C) by manual operation and always being urged in the direction of the return position by a spring member (19);

(2) a slider (2) is moved in the direction of an operative position from a return position by said manually operative means (16) against the force of a return spring (3) within a body (1);

(3) a locking structure (6) including a grooved cam (4) formed in a surface of the slider (2) and a cam follower (5), one end of said cam follower being secured to said body, said grooved cam (4) defining an endless loop-shaped configuration and having a first engagement portion (a) for holding said manually operative means at the return position, and a second engagement portion (b) for holding said manually operative means at the operative position, each of said engagement portions being provided where the grooved cam (4) intersects with the direction of movement of said slider (2), (4) said cam follower (5) including a spring means and a free end of which reiterates the movement around the groove of the grooved cam with the engagement with each of said engagement portions (a) and (b) and the disengagement therefrom each time said slider (2) reciprocally moves, the free end (5b) of said cam follower (5) engaging the first engagement portion (a) of the grooved cam when the slider (2) occupies the return position and engaging the second engagement portion when the slider (2) occupies the operative position;

(5) a cancelling member (21) disposed for slidable movement at one side of the body (1), said cancelling member (21) engage part of the cam follower (5) with movement in a predetermined direction only when the free end (5b) thereof occupies the second engagement portion (b) and further to disengage said free end (5b) from the second engagement portion (b), whereby the slider (2) is allowed to move in the direction of the return position by means of the spring (3);

(6) an electromagnetic solenoid (24) which moves the cancelling member (21) in said return direction when energized;

(7) an electric circuit having a photo sensing means for detecting the light from an on-coming vehicle and thereby energizing the electromagnetic solenoid (24) in response to an output of the photo sensing means in order to move the manually operative means back to the return position; and (8) a contact structure associated with said slider, said contact structure holding the head lamp (25) at the low-beam position when the slider (2) occupies the return position (a) and holding the head lamp (25) at the high-beam position when the slider (2) occupies the operative position (b).

2. A dimmer switch device as set forth in claim 1, wherein said spring means of said cam follower comprises a linear-shaped spring.

3. A dimmer switch device as set forth in claim 1, wherein;
said slider is disposed in said body and operatively associated with lighting control means which is moveable between an on position which activates the head lamp circuit and an off position which deactivates said head lamp circuit, and releasing said cam follower from said second engagement portion when said lighting control means is deactivated.

4. A dimmer switch device as set forth in claim 1, wherein said slider reciprocates longitudinally along an axis defined by said direction of movement of said actuator.

5. A dimmer switch device as set forth in claim 1, wherein said first engagement portion and said second engagement portion are provided where said grooved cam intersects with said axis.

6. A dimmer switch device as set forth in claim 1, wherein said actuator is mounted for longitudinal reciprocation between said return position and said operative position.

7. A dimmer switch device for use with head lamps of an automotive vehicle according to claim 1, further comprising;
a lighting lever, an auxiliary cancelling member disposed for movement in association with said lighting lever, said auxiliary cancelling member engaging the cam follower when said lighting lever occupies a position (OFF) or (S L) to turn off the head lamp and to release the cam follower from the engagement with the second engagement portion.

* * * * *